United States Patent Office 3,419,635
Patented Dec. 31, 1968

3,419,635
ROOM TEMPERATURE VULCANIZING ORGANOPOLYSILOXANE-POLYCARBONATE COMPOSITIONS
Howard A. Vaughn, Jr., Schenectady, N.Y., assignor to General Electric Company, a corporation of New York
No Drawing. Filed Jan. 3, 1966, Ser. No. 517,909
13 Claims. (Cl. 260—824)

ABSTRACT OF THE DISCLOSURE

Room temperature vulcanizing compositions are provided comprising organopolysiloxane-polycarbonate block copolymer having chemically combined organosilyl radicals with hydrolyzable radicals attached to silicon. The compositions of the present invention can be employed in roof coating applications, as sealants, etc.

---

The present invention relates to room temperature vulcanizing compositions comprising organopolysiloxane-polycarbonate copolymers and a method for making them. More particularly, the present invention relates to block copolymers of organopolysiloxane and polycarbonate having organosilyl radicals with hydrolyzable radicals attached to silicone.

The compositions of the present invention comprise copolymers having attached by carbon-silicon linkages monovalent organosilyl radicals of the formula, (1) 

which copolymers consist essentially of chemically combined blocks of (A) from 1 to 95 percent by weight of organopolysiloxane consisting essentially of chemically combined diorganosiloxy units of the formula, (2) $R'_2SiO$ and (B) 5 to 99 percent by weight of the reaction product of a dihydroxy compound of the formula, (3) HO Z OH and a member selected from a carbonyl halide and a diaryl carbonate, where Y is a hydrolyzable radical, R is a monovalent radical free of aliphatic unsaturation selected from hydrocarbon radicals and halogenated hydrocarbon radicals, R' is selected from monovalent hydrocarbon radicals, halogenated monovalent hydrocarbon radicals and cyanoalkyl radicals, Z is selected from R" and R"WR", R" is selected from divalent hydrocarbon radicals and halogenated divalent hydrocarbon radicals, W is a divalent radical selected from

divalent cycloaliphatic radicals, divalent oxyaryleneoxy radicals, sulfonyl, sulfinyl, oxy, thio, etc. and R''' is selected from hydrogen and R radicals, and $a$ is a whole number equal to 0 to 2, inclusive.

Radicals included by R of the above formulae are monovalent aryl radicals and halogenated monovalent aryl radicals, such as phenyl, chlorophenyl, tolyl, naphthyl, etc.; aralkyl radicals such as benzyl, phenylethyl, etc.; aliphatic radicals, cycloaliphatic radicals and haloaliphatic radicals, for example, methyl, ethyl, propyl, chloropropyl, trifluoropropyl, butyl, pentyl, hexyl, octyl, etc., cyclobutyl, cyclohexyl, cycloheptyl, etc. Radicals included by R' are all of the aforementioned R radicals as well as vinyl, allyl, propenyl, etc., cyanoalkyl such as cyanoethyl, cyanopropyl, cyanobutyl, etc. Radicals included by R" are divalent aryl radicals and divalent halogenated aryl radicals such as phenylene chlorophenylene, tolylene, xylylene, naphthalene, chloronaphthalene, etc., divalent alkylenearylene radicals such as ethylenephenylene, propylenetolylene, ethylenechlorophenylene, etc., alkylene such as methylene, ethylene, propylene, etc.

Y is selected from hydrolyzable radicals such as acyloxy radicals, for example, formoxy, acetoxy, propionoxy, etc.; ketoximato, for example, dimethyl ketoximato, methylethyl ketoximato, etc.; aminoxy, for example, diethylaminoxy, dimethylaminoxy, etc. In the above formulae, where R, R', R", R''', W, Y, and Z can represent more than one radical respectively these radicals can be all the same or any two or more of the aforementioned radicals.

The room temperature vulcanizing organopolysiloxane-polycarbonate block copolymers of the present invention include copolymers in which the organosilyl radicals of Formula 1 are in the terminal position. These copolymers can be made by effecting addition between a silicon hydride of the formula, (4) 

and an organopolysiloxane-polycarbonate block copolymer having terminal olefinically unsaturated groups of the formula, (5) 

where $b$ can be 1 or 2, $d$ is 0 or 1,

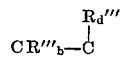

can be part of an unsaturated aliphatic radical such as an olefinic or acetylenic radical, or an unsaturated cycloaliphatic radical, and Q is a divalent non-polar linkage, such as —O—

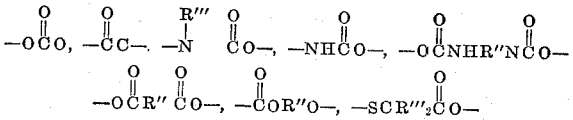

etc., where Y, R, R", and R''' are as defined above. These block copolymers having terminal radicals of Formula 5 and method for making them are shown in my copending application Ser. No. 517,920 filed concurrently herewith and assigned to the same assignee as the present invention.

Block copolymers having terminal aliphatically unsaturated groups of Formula 5 which are attached to the copolymer by carbonate linkages, can be made by phosgenating a mixture of (C) the dihydroxy compound of Formula 3, (D) an organopolysiloxane of the formula, (6) 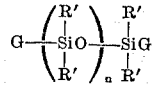

and (E) an aliphatically unsaturated monohydroxy compound of the formula, (7) 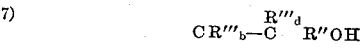

where R', R", b, d, and

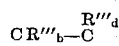

are defined above, G is selected from

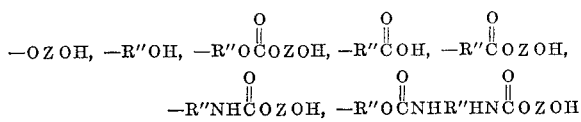

etc. where Z and R" are as previously defined, and $n$ is an integer equal to 1 to 500, inclusive. In Formula 6 where G can provide for R"Q linkages between organopolysiloxane blocks and polycarbonate blocks, R" is preferably alkylene, divalent cycloalkane, alkylenearylene and halogenated derivatives thereof, for example, ethylene, propylene, butylene, etc., cyclobutylene, cyclopentylene, etc., ethylenephenylene, propylenechlorophenylene, etc.

For purposes of defining the block copolymers of the present invention with respect to the percent by weight of the organopolysiloxane blocks in the copolymer based on the total weight of the copolymer, the weight of the organopolysiloxane blocks will be defined in terms of chemically combined organosiloxane units even though prior to phosgenation OZOH radicals can be attached to the organopolysiloxane. Copolymers having R"Q linkages between the organopolysiloxane blocks and the polycarbonate blocks will have the weight of the R"Q linkage included in the weight of the organopolysiloxane blocks. The weight of the terminal R"Q radicals shown by Formula 5 as well as attached radicals of Formula 1 can be included in the weight of the polycarbonate blocks.

The organopolysiloxanes of Formula 6 having terminal OZOH radicals can be made by effecting reaction between the dihydroxy compound of Formula 3 and a halogen-terminated organopolysiloxane of the formula, (8)

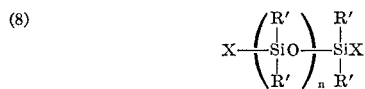

where X is a halogen radical, in accordance with the method shown in my Patent 3,189,662 assigned to the same assignee as the present invention.

The preferred dihydroxy compounds of Formula 3 are bisphenols of the formula, (9)

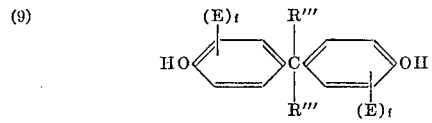

where R''' is defined above, E is selected from X radicals and alkyl radicals, and $f$ is a whole number equal to 0 to 4, inclusive.

The organopolysiloxanes of Formula 6 having terminal organohydroxy radicals of the formula, (10)

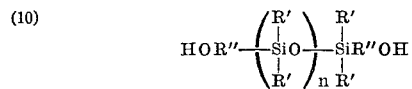

where R', R" and $n$ are as defined above, form carbonate linkages when phosgenated with dihydroxy compounds of Formula 3. The organopolysiloxanes of Formula 10 can be made by equilibrating cyclopolysiloxanes of the formula,

where R' is defined above, and $m$ is an integer equal to 3 to 20, with 2,2-diorgano-1-oxa-2-silacycloalkanes such as 2,2-dimethyl-1-oxa-2-silacyclohexane, 2,2-diphenyl-1-oxa-2-silacyclohexane, etc. These silacycloalkanes are taught by R. P. Anderson, Patent 3,083,219, assigned to the same assignee as the present invention. In addition, organopolysiloxanes included by Formula 10 also can be made by effecting addition between an aliphatically unsaturated hydroxy compound included by Formula 7 and an organopolysiloxane of the formula,

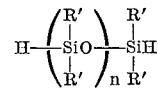

where all the terms are defined above. Details of this method are shown in the copending application of K. W. Krantz, filed concurrently herewith and assigned to the same assignee as the present invention. In addition, direct equilibration of lower molecular weight addition products such as the disiloxane corresponding to Formula 10 and the above shown cyclopolysiloxanes also can be employed.

In addition to the organopolysiloxanes of Formula 10 having terminal organohydroxy radicals which provide for copolymers having carbonate linkages, the organopolysiloxanes of Formula 6 also include organopolysiloxanes having terminal ester linkages of the formula,

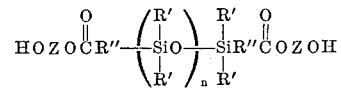

where all the terms shown are as previously defined. Terminal ester linkages are preferably made in the above organopolysiloxanes by effecting reaction between an organopolysiloxane acid halide and a dihydroxy compound of Formula 3 in the presence of an acid acceptor such as pyridine. Organopolysiloxane acid halides can be made by equilibrating mixtures of cyclopolysiloxanes and 1,3-bis(carboxyalkyl)tetraorganosiloxanes of 1,3-bis(carboxyaryl)tetraorganosiloxanes and converting the resulting carboxy chain-stopped organopolysiloxane as shown above to the organopolysiloxane acid halide. A halogenating procedure is shown by Bailey et al. Patent 3,119,855.

A further example of organopolysiloxane included by Formula 6 are organopolysiloxane polymers having terminal urethane linkages of the formula,

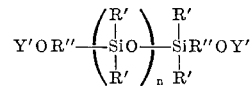

where Y' can be for example,

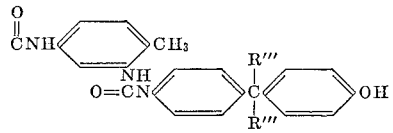

As shown above, organopolysiloxane-polycarbonate copolymers having terminal aliphatically unsaturated groups of Formula 5 attached to the copolymer by carbonate linkages can be made by phosgenating a mixture of a dihydroxy compound included by Formula 3, an organopolysiloxane of Formula 6, and an olefinically unsaturated hydroxy compound of Formula 7. Olefinically unsaturated block copolymers having terminal olefinically unsaturated groups of Formula 5 also can be made by a stepwise method. A mixture of a dihydroxy compound of Formula 3 and an organopolysiloxane of Formula 6 can be phosgenated. The resulting copolymer can thereafter be treated with an aliphatically unsaturated compound of Formula 7 or the phosgenated mixture after hydrolysis can be treated with an aliphatically unsaturated isocyanate, including a polyisocyanate in combination with an aliphatically unsaturated hydroxy compound of Formula 7.

An additional method which can be employed to make the organopolysiloxane-polycarbonate block copolymers of the present invention is by transesterification with diaryl carbonate and dihydroxy compounds of Formula 3. This method is described on pages 44–51 of Chemistry and Physics of Polycarbonates by Herman Schnell, Interscience Publishers, John Wiley and Sons, New York (1964). A further method which can be employed is by direct phosgenation of a mixture of dihydroxy compounds of Formula 3 and organo-polysiloxane of Formula 6 having terminal carboxy radicals.

Isocyanates which can be employed to provide terminal olefinic unsaturation in the copolymer of the present invention in place of the monohydroxy compounds of Formula 6 are olefinically unsaturated isocyanates such as,

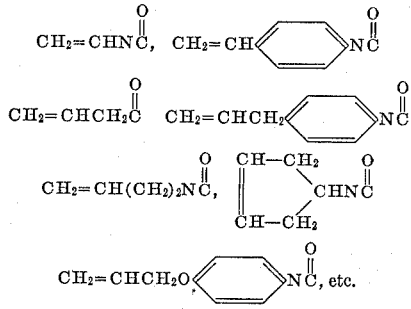

Polyisocyanates which can be used in combination with the olefinically unsaturated monohydroxy compound of Formula 7 to provide for terminal olefinic unsaturation in the copolymer are for example,

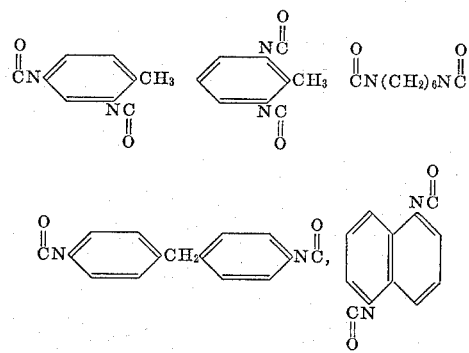

Silicon hydrides included by Formula 4 are for example, acyloxysilane such as

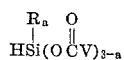

where V is hydrogen or an alkyl radical, for example,

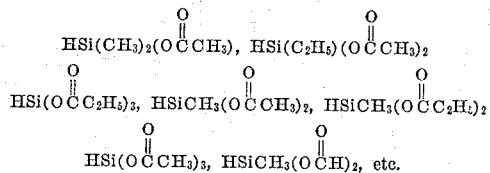

ketoximatosilanes such as,

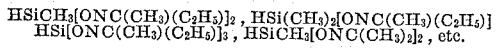

halosilanes, such as

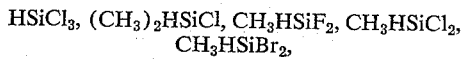

etc.

Methods for providing for the production of aminoxy radicals included by Y of Formula 1 are shown in copending application of R. A. Murphy, Ser. No. 423,354 filed Jan. 4, 1965 and assigned to the same assignee as the present invention which application is incorporated herein by reference.

Alcohols included by Formula 7 are aliphatically unsaturated alcohols such as,

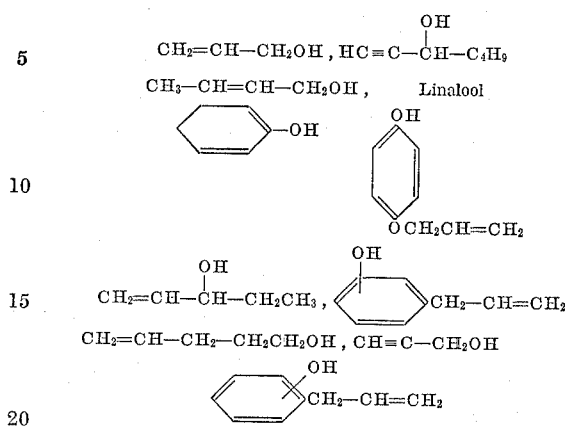

There are included by the bisphenols of Formula 9 2,2-bis(4-hydroxyphenyl)propane (Bisphenol-A), 2,4'-dihydroxydiphenylmethane, bis(2 - hydroxyphenyl)methane, bis(4-hydroxyphenyl)methane, 1,1-bis(4-hydroxyphenyl)ethane, 1,2 - bis(4- - hydroxyphenyl)ethane, 1,1-bis(4-hydroxy-2-chlorophenyl)ethane, 1,1-bis(2,5-dimethyl - 4-hydroxyphenyl)ethane, 1.3 - bis(3-methyl-4-hydroxyphenyl) propane, 2,2 - bis(3-isopropyl-4-hydroxyphenyl)propane, 2,2 - bis(4 - hydroxyphenyl)hexylfluoropropane, etc. In addition, 4,4' - sec - butylidenediphenol, 4,4' - methylene(2,6-di-tert-butylphenol), 2,2'-methylene-(4-methyl-6-tert-butylphenol), etc. In addition to the bisphenols of Formula 9, further examples of dihydroxy compounds included by Formula 3 are shown on page 69 of Chemistry and Physics of Polycarbonates by Herman Schnell, as previously cited. Other examples of dihydroxy compounds which can be employed in the practice of the invention are shown in the table on pages 162 to 163 of Polycarbonates by William F. Christopher and Daniel W. Fox, Reinhold Publishing Corp. (1962). For example, such dihydroxy compounds are included by the following formula.

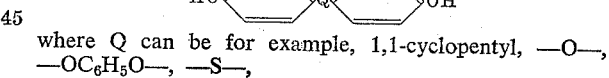

where Q can be for example, 1,1-cyclopentyl, —O—, —OC₆H₅O—, —S—,

etc.

The organopolysiloxane-polycarbonate block copolymers of the present invention having attached by carbon-silicon linkages, monovalent organosilyl radicals of Formula 1, are convertible into rubbery products having an elongation at break of up to 1000% or more, or substantially rigid products having an elongation of less than 200% depending upon the weight percent of organopolysiloxane blocks based on the total weight of the organopolysiloxane and polycarbonate copolymer. For example, copolymers having a weight percent of from 50 to 95, and preferably from 50 to 85 percent by weight of organopolysiloxane based on the total weight of copolymer can provide for organopolysiloxane elastomers having valuable characteristics. A proportion of less than 50 percent by weight of organopolysiloxane based on the weight of copolymer will provide for the production of essentially rigid film-forming materials which can be advantageously employed in coating applications.

The room temperature vulcanizing copolymers of the present invention can be employed for many of the conventional applications to which organopolysiloxane elastomers and polycarbonates are utilized. Specific applications are as roof coatings, coatings for aluminum sidings, elastomers having improved solvent resistance, flexible windows for vehicles, transparent rubber gaskets for glass windows, insulating material, rigid or rubbery clear finish for architectural uses on wood, copper, etc.

In the practice of the invention, addition is effected between the silicon hydride of Formula 4 to the organopolysiloxane-polycarbonate block copolymer having aliphatic unsaturation at temperatures in the range of between 20° C. to 200° C. The addition is preferably accomplished in the presence of a platinum catalyst, for example, in the form of a platinum-olefin complex as shown in Ashby patent 3,159,601, or in the form of a chloroplatinic acid-alcoholate as shown in Lamoreaux patent 3,220,972 which are both assigned to the same assignee as the present invention. A method for making aliphatically unsaturated copolymer which can be utilized in the practice of the present invention to provide for the production of room temperature vulcanizing composition is shown in my copending application Ser. No. 517,920. For example, phosgenation of the mixture of the dihydroxy compound of Formula 3, the organopolysiloxane of Formula 6 and the aliphatically unsaturated monohydroxy compound of Formula 7 can be effected at temperatures between 0° C. to 200° C.

Experience has shown that the room temperature vulcanizing copolymers of the present invention are preferably utilized in combination with a suitable organic solvent to facilitate the application of the copolymer to a substrate. Suitable organic solvents are for example, methylene chloride, benzene, tetrahydrofuran, chloroform, dioxane, sym-tetrachloroethane, etc. Experience also has demonstrated that the room temperature vulcanizing copolymer in combination with a suitable solvent can be further utilized in combination with fillers, in proportions of up to 100 parts of filler, per 100 part of copolymer. Fillers such as carbon black, diatomaceous earth, fumed silica, titania, iron oxide, etc., can be employed.

It has been found that the compositions comprising the curable copolymer of the present invention along with other ingredients such as solvent, filler, etc. can remain stable for at least 6 months or more at a temperature in the range of between 0° C. to 100° C., if there are present no more than 100 parts of water per million parts of composition. Well known procedures can be employed to minimize the presence of water in the final composition. Additionally, mixing of the ingredients can be performed under an inert atmosphere such as nitrogen, etc.

In addition to ingredients such as solvents, fillers, the room temperature vulcanizing copolymers of the present invention can be blended with curing accelerators such as lead octoate, dibutyltindilaurate, and stannous octoate.

In order that those skilled in the art will be better able to practice the invention, the following examples are given by way of illustration and not by way of limitation. All parts are by weight.

Example 1

A chlorine chain-stopped polydimethylsiloxane of the average formula

was perpared by adding over a 2 hour period, a mixture of 100 parts of water and 206 parts of dioxane to 800 parts of dimethyldichlorosilane. While the resulting mixture was stirred, it was heated to a gentle reflux until it became homogeneous. It was stripped in vacuo to a pot temperature of 202° C. at 12 mm. pressure. Its hydrolyzable chlorine content was 4.6 percent.

A solution of 225 parts of the above chlorine chain-stopped polydimethylsiloxane in 130 parts of dry methylene chloride was added to a mixture of 114 parts of 2,2-bis(4-hydroxyphenyl)propane, 1300 parts of methylene chloride and 130 parts of dry pyridine. The addition was performed over a period of 65 minutes while the resulting mixture was vigorously agitated. Based on method of preparation, there was obtained a polydimethylsiloxane having terminal radicals of the formula

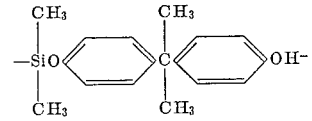

The mixture containing the above polydimethylsiloxane and 2,2-bis(4-hydroxyphenyl)propane was phosgenated at a rate of about 0.74 parts of phosgene per minute over a 50 minute period. During the phosgenation, the temperature rose to 38° C. Phosgenation was continued until phosgene was detected in the exit gases. The mixture was then purged with nitrogen. An aqueous solution of pyridine was added. A copolymer was precipitated by adding methanol to the mixture. The copolymer was washed four times with additional methanol. After drying at 100° C., there was obtained a copolymer having terminal

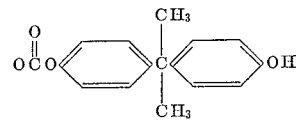

radicals. Its intrinsic viscosity in chloroform was found to be 0.23 dl./g. Based on method of preparation, the copolymer was composed of about 36 percent by weight of polycarbonate blocks chemically combined with about 64 percent by weight of polydimethylsiloxane blocks of the average formula

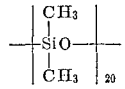

based on the weight of copolymer.

There was added 1.83 parts of allyl isocyanate to a solution of 50 parts of the above-described copolymer and 250 parts of dry toluene, in the presence of 0.02 part of dibutyltindilaurate. While substantially anhydrous conditions were maintained, the mixture was heated for 22 hours at 100° C. and an additional 0.02 part of dibutyltindilaurate was added. After 24 hours of additional reflux utilizing 0.06 part of zirconium octoate, infrared indicated that the mixture was free of isocyanate. Based on method of preparation, the resulting copolymer had terminal

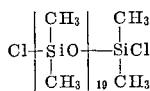

radicals. To this mixture there was added 0.0028 part of platinum in the form of a chloroplatinic acid-octyl alcohol complex and the solution was heated to 90° C. There were then added 3.57 parts of methyldiacetoxy silane. After 11 hours at 100° C., infrared showed that the addition of silicon hydride to the allyl terminated polymer had been completed. Based on method of preparation, a copolymer was produced having terminal

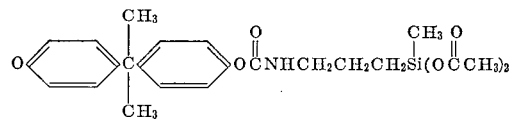

radicals. The mixture was poured into an aluminum tray. A tack-free film formed when the mixture was allowed to remain under atmospheric conditions for 2 hours. After 48 hours, the tensile strength at break of a sample of the cured copolymer was 400 p.s.i. at 200 percent elongation. These results were a significant improvement over the uncured copolymer.

Example 2

There were added over a period of 70 minutes with stirring, 225 parts of the chlorine chain-stopped dimethylsiloxane of Example 1 in 130 parts of methylene chloride to a mixture of 114 parts of 2,2-bis(4-hydroxyphenyl)propane and 130 parts of dry pyridine, and 1300 parts of methylene chloride. When this addition was completed, 1.3 part of allyl alcohol was added to the mixture. Phosgene was passed into the mixture until the presence of phosgene in the exit gases indicated that the reaction had gone to completion. Nitrogen was then passed into the mixture for about 15 minutes to purge out excess phosgene. Another 5 parts of allyl alcohol were added to the reaction mixture followed by a solution of 2 parts of water in 5 parts of pyridine. Methanol was then added to the mixture to effect precipitation of product. It was washed three times with additional methanol in a blender. Based on method of preparation, the product was a copolymer composed of about 64 percent by weight of polydimethylsiloxane blocks chemically combined with about 36 percent by weight of polycarbonate blocks based on the weight of copolymer. It had terminal

radicals joined to polycarbonate blocks.

The above procedure was repeated except that in place of allyl alcohol there were utilized 2.75 parts of 2-allylphenol initially and 5 parts of 2-allylphenol at the termination of the phosgenation reaction. A copolymer was obtained having

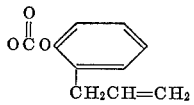

radicals joined to polycarbonate blocks.

The above-described allyl terminated copolymer (A) and the allylphenyl terminated copolymer (B) were then converted by the following procedure to room temperature vulcanizing compositions of the present invention.

A mixture of 50 parts of the allylcarbonate-terminated copolymer (A), 220 parts of toluene and 0.0028 part of platinum in the form of a platinum alcoholate as utilized in Example 1 was heated to 90° C. There were then added incrementally over a period of several days, 7.6 parts of methyldiacetoxysilane to the solution. The addition was performed under substantially moisture-free conditions. After the addition was completed, 5 parts of the solution were placed in an aluminum cup with 0.02 part of stannous octoate and exposed to the atmosphere. A tack-free film was formed after 2 hours. A sample was cut from the film after 24 hours.

The above procedure was repeated except that the 2-allylphenyl carbonate chain-stopped copolymer (B) was substituted for (A). The addition of the methyldiacetoxysilane was performed in 2 hours. A portion of the solution was treated with 0.004 part of dibutyltindilaurate and poured into an aluminum tray and exposed to the atmosphere. It was tack-free after 2 hours. A sample also was cut from a film of the cured copolymer.

The table below shows the results obtained with respect to copolymer (A) and copolymer (B) with respect to "T" tensile (p.s.i.) and "E" elongation (percent) prior to cure "Uncured" and after cure "Cured."

|   | Uncured | | Cured | |
| --- | --- | --- | --- | --- |
|   | T | E | T | E |
| A | 185 | 175 | 890 | 330 |
| B | 295 | 250 | 825 | 175 |

Example 3

A mixture of 1480 parts of octamethylcyclotetrasiloxane and 260 parts of 2,2-dimethyl-1-oxa-2-silacyclohexane is equilibrated at 180° C. for 2 hours in the presence of 1.8 part of potassium hydroxide. The resulting product is clear and homogeneous. When the product cools below 40° C., it is hydrolyzed with acetic acid. The resulting oil is then neutralized and dried with soda ash and filtered through diatomaceous earth. Based on this preparation, there is obtained a hydroxybutyldimethylsiloxy-terminated polydimethylsiloxane having an average of about 20 chemically combined dimethylsiloxy units.

A mixture of 800 parts of the above hydroxybutyldimethylsiloxy-terminated polydimethylsiloxane, 562 parts of octamethylcyclotetrasiloxane, and 34.4 parts of 2,4,6,8-tetramethyltetravinylcyclotetrasiloxane and 1.3 part of potassium hydroxide was stirred at a temperature of 180° C. for about 2.5 hours. After the mixture cooled to room temperature, it was mixed with about 6 parts of concentrated hydrochloric acid. The mixture was then agitated for about 1 hour, and 20 parts of sodium bicarbonate were slowly added. The mixture was then filtered and the product was stripped to 180° C. at 4 torr. There was obtained a hydroxybutyldimethylsiloxy terminated polydiorganosiloxane having an average of about 40 chemically combined diorganosiloxy units consisting essentially of dimethylsiloxy units and about 2.5 mole percent of methylvinylsiloxy units based on the total diorganosiloxy units.

A block copolymer having terminal

radicals was prepared by phosgenating a mixture of 57 parts of 2,2-bis(4-hydroxyphenyl)propane, 1340 parts of methylene chloride, 75 parts of pyridine, 1.3 part of allyl alcohol and 75 parts of the above-described hydroxybutyldimethylsiloxy terminated polydiorganosiloxane. The resulting copolymer was recovered by precipitation with methanol, washed, etc., as described in Example 1. A 90 percent yield of copolymer was obtained based on starting reactants. Based on method of preparation, the copolymer was composed of about 54 percent by weight of polydiorganosiloxane blocks having terminal

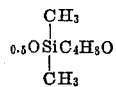

units chemically combined with 46 percent by weight of the polycarbonate blocks based on the weight of copolymer. It showed 510 tensile (p.s.i.) and 50 percent elongation.

There were added over a 12 minute period, 2.3 parts of methyldiacetoxysilane in the form of a benzene solution to a mixture of 50 parts of the above block copolymer, 0.0014 part of platinum in the form of the complex of Example 1, and 240 parts of benzene. The mixture was heated for about 2.5 hours at reflux. Based on method of preparation, a room temperature vulcanizing copolymer was obtained having terminal

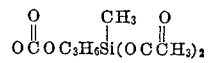

radicals. A portion of the copolymer solution containing 0.25 percent by weight of copolymer of dibutyltindilaurate was poured into an aluminum tray. A tack-free film was obtained in less than 2 hours. A cured slab showed 1780 tensile strength (p.s.i.), and 85 percent elongation at break.

Example 4

An organopolysiloxane-polycarbonate copolymer having terminal

radicals was prepared in accordance with the procedure of Example 3 by phosgenating a mixture of 114 parts of 2,2-bis(4-hydroxyphenyl)propane, 45 parts of the hydroxybutyldimethylsiloxy - terminated - polydiorganosiloxane of Example 3 composed of about 40 chemically combined diorganosiloxy units, 0.86 part of allyl alcohol, 2700 parts of methylene chloride and 140 parts of pyridine. The phosgenation was conducted at a temperature of about 26° C. to 33° C. over a period of 160 minutes. Based on method of preparation, the resulting copolymer was composed of about 27 percent by weight of polydiorganosiloxane blocks having terminal

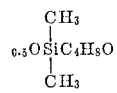

units chemically combined with about 73 percent by weight of polycarbonate blocks based on the weight of copolymer.

A room temperature vulcanizing organopolysiloxane-polycarbonate copolymer having terminal

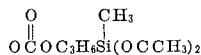

radicals was prepared by adding 3.3 parts of methyldiacetoxysilane in tetrahydrofuran to a mixture of 50 parts of the above organopolysiloxane-polycarbonate block copolymer, 240 parts of tetrahydrofuran and 0.0014 part of platinum in the form of the catalyst utilized in Example 1.

A sample of the mixture was poured into an aluminum tray. A catalytic amount of stannous octoate was added. In addition, about 3 parts of methyltriacetoxysilane was added to the mixture. A cured film was obtained which was insoluble in methylene chloride.

Example 5

A mixture of 200 parts of the polydiorganosiloxane utilized in Example 3 having an average of about 40 chemically combined diorganosiloxy units and terminal hydroxybutyldimethylsiloxy units, 21.5 parts of toluene diisocyanate and 1100 parts of chlorobenzene was heated at 100° C. for 4 hours. The resulting mixture was poured with stirring into a solution of 114 parts of 2,2-bis(4-hydroxyphenyl)propane, 130 parts of dry pyridine, and 1100 parts of chlorobenzene. 1.3 parts of allyl alcohol was added to this mixture. The mixture was then phosgenated. At the termination of the phosgenation, which was determined by the presence of phosgene in the exit gases, an additional 8.6 parts of allyl alcohol were added to the mixture to remove excess phosgene and chlorocarbonate end groups. A copolymer was then precipitated with methanol and dried after washing with methanol in an oven at 100° C. Based on method of preparation, the copolymer had terminal $$CH_2=CHCH_2O\overset{O}{\underset{\|}{C}}O$$

radicals. It was composed of about 64 percent by weight of polydiorganosiloxane blocks having terminal

units chemically combined with 36 percent by weight of polycarbonate blocks based on the weight of copolymer.

There are added 2.3 parts of methyldiacetoxysilane to a mixture of 50 parts of the above copolymer in the presence of 0.0014 part of platinum in the form of the catalyst used in Example 1, and 240 parts of benzene. The mixture of methyldiacetoxysilane and copolymer is then heated for 2 hours. A portion of the mixture is poured into an aluminum tray and allowed to cure under atmospheric conditions. A tough film is obtained which is insoluble in methylene chloride.

Example 6

A mixture of 50 moles of octamethylcyclotetrasiloxane, per mole of tetramethyl-1,3-bis(γ - carboxypropyl)disiloxane was equilibrated for 2 hours at 100° C. utilizing 3 percent by weight of the mixture of sulphuric acid at 86 percent concentration. The mixture was cooled and an organopolysiloxane fluid was separated from the acid in a separatory funnel. The organopolysiloxane fluid was washed with salt water and dried with sodium sulfate. Based on method of preparation, the fluid was a carboxy terminated polydimethylsiloxane of the average formula,

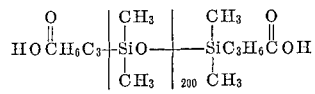

The above organopolysiloxane was then heated in the absence of atmospheric moisture with thionyl chloride which is utilized in an amount sufficient to convert the above polydimethylsiloxane to a polydimethylsiloxane having terminal

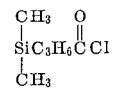

radicals. There also was utilized sufficient calcium carbonate to neutralize and absorb the hydrogen chloride produced during the reaction. The mixture was heated for about 3 hours. Pyridine was then added dropwise until no more pyridine hydrochloride formed. A small amount of carbon black was then added to the mixture. The mixture then was filtered while being maintained under substantially anhydrous conditions.

Two hundred parts of the above polydimethylsiloxane having terminal

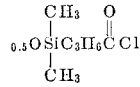

units was added over a period of 30 minutes to a stirred solution of 114 parts of 2,2-bis(hydroxyphenyl)propane, 130 parts of dry pyridine and 3300 parts of methylene chloride. There was then added 1.3 part of allyl alcohol to the resultant mixture. The mixture was then phosgenated to effect copolymerization. Excess phosgene and chlorocarbonate end groups were destroyed by the addition of allyl alcohol. Two hundred eighty seven parts of product were precipitated by adding methanol to the mixture. Based on method of preparation, the product was a copolymer having terminal $$CH_2=CHCH_2O\overset{O}{\underset{\|}{C}}O$$

radicals joined to polycarbonate blocks; it was composed of about 61 percent by weight of polyorganosiloxane composed of polydimethylsiloxane blocks having terminal

units chemically combined with about 39 percent by weight of polycarbonate blocks based on the weight of copolymer.

To 50 parts of the above copolymer dissolved in 240 parts of boiling benzene are added 0.0014 part of platinum in the form of the catalyst of Example 1, and 2.5 parts of methyldiacetoxysilane. This mixture is heated for 2 hours. The resulting product is treated with a catalytic amount of dibutyltindilaurate. Upon exposure to atmospheric moisture the product cures to an insoluble film.

Example 7

In accordance with the procedure of Example 6, a mixture of 2 moles of octamethylcyclotetrasiloxane, per mole of tetramethyl-1,3-bis(γ-carboxypropyl)-disiloxane is equilibrated. A polydimethylsiloxane is recovered having the average formula,

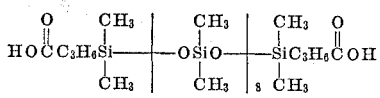

The polydimethylsiloxane is then treated with thionyl chloride in accordance with the procedure of Example 6 to produce a polydimethylsiloxane having terminal

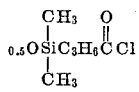

units.

There were added over a period of 30 to 45 minutes a solution of 100 parts of the above polydimethylsiloxane in methylene chloride to a mixture of 57 parts of 2,2-bis(4-hydroxyphenyl) propane, 1300 parts of methylene chloride and 65 parts of pyridine. There were also added 0.65 part of allyl alcohol. While the mixture was vigorously stirred, phosgene was passed into the mixture over a period of about 2 hours at a rate between 0.5 part to about 0.06 part per minute. Phosgenation was stopped when unreacted phosgene appeared in the exit gases. There were then added to the mixture an additional 10 parts of allyl alcohol. A product was then precipitated in accordance with the previously described procedure and dried. Based on method of preparation, the product was a copolymer having terminal allyl carbonate radicals joined to polycarbonate blocks. The copolymer was composed of 58 percent by weight of polydimethylsiloxy blocks having terminal

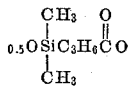

units chemically combined with about 42 percent by weight of polycarbonate blocks based on the weight of copolymer.

A solution of 50 parts of the above copolymer and 270 parts of boiling benzene was mixed with 0.0015 part of platinum in the form of a chloroplatinic acid-octyl alcohol complex. There were then added to the resulting mixture 2.5 parts of methyldiacetoxysilane. The mixture was heated for 2 hours. After the mixture cooled to room temperature, a catalytic amount of stannous octoate was added. A portion of the solution was poured into a tin-plated steel tray and exposed to atmospheric conditions. A film was obtained after 16 hours. It was insoluble in methylene chloride.

Example 8

There are added a temperature of 90° C., 294 parts of a polydimethylsiloxane of the average formula,

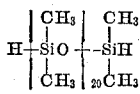

to a mixture of 60 parts of 2-allylphenol and 0.0014 part of platinum as a chloroplatinic acid-alcoholate complex. The mixture is stirred for a period of about 3 hours while maintaining a temperature between 90° C. to 115° C. An infrared spectrum of a portion of the mixture shows it is free of silicon hydride. The mixture is allowed to cool to room temperature. A product is recovered by extraction with methylene chloride followed by washing the extract with a solution of 4 parts of methanol per part of water. The product is dried with anhydrous sodium sulfate and stripped of solvent to a temperature of 115°

C. in vacuo. Based on method of preparation the product is a polydimethylsiloxane having the average formula,

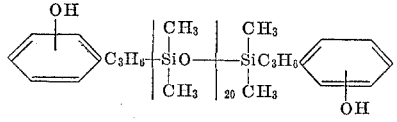

Phosgene was passed into a mixture of 57 parts of 2,2-bis(4-hydroxyphenyl)propane, 70 parts of pyridine, 1300 parts of methylene chloride, 100 parts of the above polydimethylsiloxane having terminal γ-(2-hydroxyphenyl)-propyldimethylsiloxy units and 2.95 parts of 2-allylphenol. The mixture was phosgenated until unreacted phosgene appeared in the exit gases. Excess 2-allylphenol was then added to the mixture to react with any excess phosgene or chlorocarbonate end groups. A copolymer was precipitated in accordance with the previously described procedure by the addition of methanol. There was obtained 150 parts of copolymer having terminal

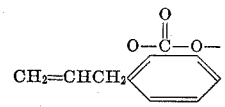

radicals. This represented an 88 percent yield based on starting reactants. The copolymer had polydimethylsiloxane blocks having terminal

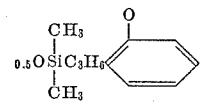

units chemically combined with polycarbonate blocks.

There were dissolved 50 parts of the above copolymer in 240 parts of dry benzene. To this solution there was added 0.0014 part of platinum as a platinum-alcoholate complex and the resulting mixture was heated to reflux. Then 2.3 parts of methyldiacetoxysilane were added over a period of 6 minutes. The mixture was refluxed for 45 minutes. There were added 0.14 part of dibutyltindilaurate, to 35 parts of the mixture. The mixture was then exposed to the atmosphere in a tin-plated tray. It was tack-free within three hours. After 40 hours a cross-linked, insoluble film was formed. Slabs were pulled on an Instrom tensile tester at a crosshead speed of 2 in./min. The slabs showed a tensile strength of 1490 p.s.i. and elongation at break of 125 percent.

Example 9

There are added 225 parts of the chlorine chain-stopped polydimethylsiloxane of Example 1 in 130 parts of methylene chloride to a mixture of 76.5 parts of bis(4-hydroxy-2,5-dimethylphenyl)sulfone, 130 parts of pyridine and 1300 parts of methylene chloride over a period of 50 minutes. There is then added to the mixture, 57 parts of 2,2-bis(4-hydroxyphenyl)propane, and 1.3 parts of allyl alcohol. The mixture is then phosgenated until unreacted phosgene is detected in the exit gases. An aditional 8.5 parts of allyl alcohol is then added to the mixture. A copolymer having terminal

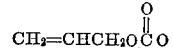

joined to polycarbonate blocks is precipitated with methanol in accordance with the previously described procedure. Based on the method of preparation, the copolymer is composed of 61 percent by weight of organopolysiloxane composed of polydimethylsiloxane blocks chemically combined with 39 percent by weight of polycarbonate blocks by linkages such as

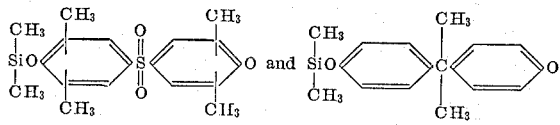

A film of the copolymer is cast from methylene chloride. It shows valuable elastomeric and insulating properties.

There are added 2.5 parts of methyldiacetoxysilane to a solution of 50 parts of the above copolymer in 270 parts of dry benzene and 0.0014 parts of platinum as a plyatinum-alcoholate complex while the solution is refluxed. A mixture is then heated for 3.5 hours. A catalytic amount of dibutyltindilaurate is then added to the mixture and it is poured into an aluminum tray. A tack-free film is obtained after 2.5 hours. A methylene chloride insoluble product is obtained after a 24 hour exposure to the atmosphere.

Example 10

There were added dropwise over a period of 2 hours 55.5 parts of water to a solution of 400 parts of dimethyldichlorosilane in 290 parts of diethyl ether. The mixture was heated at reflux with stirring for an additional 1.5 hours. It was then stripped of solvent to obtain a product containing 1.56 percent hydrolyzable chlorine. Based on method of preparation, it was a chlorine chain-stopped polydimethylsiloxane having an average of about 60 chemically combined dimethylsiloxy units.

A solution of 600 parts of the above polydimethylsiloxane in 134 parts of methylene chloride was added with stirring, over a period of about 1 hour, to a mixture of 114 parts of 2,2-bis(4-hydroxyphenyl)propane, 130 parts of pyridine, and 2700 parts of methylene chloride. There was then added 1.5 parts of allyl alcohol to the mixture. The mixture was then phosgenated for about four hours. The mixture was then purged with nitrogen to remove excess phosgene. Then 8.6 parts of allyl alcohol were added to react with chlorocarbonate end groups. A product was precipitated by the addition of methanol. There were obtained 612 parts of product after the precipitate had been washed four times with methanol and dried at 100° C. Based on method of preparation, the product was an unsaturated copolymer having terminal allyl carbonate radicals composed of about 83 percent by weight organopolysiloxane consisting of polydimethylsiloxane blocks chemically combined with about 17 percent by weight of polycarbonate blocks based on the weight of copolymer.

There were added 2.3 parts of methyldiacetoxysilane to a solution of 50 parts of the above copolymer in 270 parts of benzene. There were also added 0.0014 part of platinum as catalyst used in Example 7. The mixture was refluxed for 20 minutes and 0.14 part of dibutyltindilaurate was added. The resulting mixture was allowed to cure under atmospheric conditions. It was tack-free in 2 hours. It showed 340 p.s.i. tensile and 340 percent elongation.

Example 11

There were added over a period of about two hours with stirring, a solution of 52 parts of water in 79 parts of acetone to 400 parts of dimethyldichlorosilane. The resulting mixture was heated to a temperature of 51° C. over a period of about 1.5 hours. The solution was then stripped under reduced pressure to obtain 187 parts of a chlorine chain-stopped fluid containing 2.44 percent by weight of hydrolyzable chlorine. Based on the analytical results the resulting chlorine terminated polydimethylsiloxane was composed of about 39 chemically combined dimethylsiloxy units.

A solution of 23 parts of the above polydimethylsiloxane in 70 parts of methylene chloride was added dropwise with stirring, over a period of 20 minutes to a mixture of 114 parts of 2,2-bis(4-hydroxyphenyl)propane, 1340 parts of methylene chloride, and 130 parts of pyridine. When this addition was complete 0.86 part of allyl alcohol was added. Phosgene was passed into the stirred mixture for about 2.5 hours. An additional 7.5 parts of allyl alcohol were added. Following the procedure of Example 10, 130 parts of product were recovered. Based on method or preparation, the product was a copolymer composed of 15 percent by weight of organopolysiloxane consisting of polydimethylsiloxane blocks chemically combined with 85 percent by weight of polycarbonate blocks based on the weight of the copolymer.

There were added 2.3 parts of methyldiacetoxysilane to a solution of 50 parts of the above copolymer in 220 parts of benzene. There were also added 0.0014 part of platinum as catalyst utilized in Example 9. The mixture was refluxed for 20 minutes and 0.88 part of dibutyltindilaurate was added. A tough film was formed when some of the mixture was exposed to the atmosphere on a tinplate.

Based on the above results, those skilled in the art know that the room temperature vulcanizing compositions of the present invention provide for a variety of valuable products such as films, and elastomers which can be utilized in well known polycarbonate and organopolysiloxane applications. A significant feature shown by the above results is that the cured copolymers show significantly improved toughness over the uncured thermoplastic copolymers. The room temperature vulcanizing compositions of the present invention also can be advantageously utilized in the form of an organic solvent solution prior to cure and rendered insoluble in organic solvents after cure.

While the foregoing examples have of necessity been limited to only a few of the very many variables within the scope of the present invention, it should be understood that the present invention covers a much broader class of organopolysiloxane-polycarbonate block copolymers having attached by carbon-silicon linkages monovalent organosilyl radicals of Formula 1 for example,

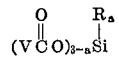

which can be attached through divalent organo radicals of the formula,

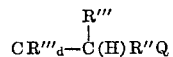

which copolymers consists essentially of chemically combined blocks of organopolysiloxane consisting essentially of chemically combined units of Formula 2 and polycarbonate blocks resulting from the reaction of a dihydroxy compound of Formula 3 and a carbonyl halide or a diaryl carbonate.

The examples also have of necessity been directed to only a few of the many process variables which can be utilized in the practice of the present invention. It should be understood however, that the process of the present invention is illustrated by both the specific examples given as well as by the detailed description of the present invention which precedes these examples.

What I claim as new and desire to secure by Letters Patent of the United States is:

1. Compositions comprising organo-polysiloxane-polycarbonate copolymers having attached by carbon-silicon linkages terminal monovalent organosilyl radicals of the formula,

which copolymer consist essentially of chemically combined blocks of (A) from 1 to 95 percent by weight of organopolysiloxane consisting essentially of chemically combined diorganosiloxy units of the formula,

and (B) 5 to 99 percent by weight of the reaction product of a dihydroxy compound of the formula,

and a member selected from the class consisting of a carbonyl halide and a diaryl carbonate, where Y is a hydrolyzable radical, R is free of aliphatic unsaturation and is selected from the class consisting of monovalent hydrocarbon radicals, and halogenated monovalent hydrocarbon radicals, R' is selected from the class consisting of monovalent hydrocarbon radicals, halogenated monovalent hydrocarbon radicals and cyanoalkyl radicals, R" is selected from the class consisting of divalent hydrocarbon radicals and halogenated divalent hydrocarbon radicals, Z is selected from the class consisting of R" and R"WR", W is a divalent radical selected from the class consisting of divalent oxyaryleneoxy radicals, sulfonyl radicals, sulfinyl radicals, oxy and thio.

2. Compositions in accordance with claim 1 in which Y of said organosilyl radical is acetoxy.

3. Compositions comprising copolymers having monovalent organosilyl radicals of the formula,

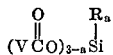

where said monovalent organosilyl radicals are bonded by carbon-silicon linkages to said copolymer through divalent organo radicals of the formula,

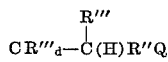

which copolymers consist essentially of chemically combined blocks of (A) from 1 to 95 percent by weight of polydiorganosiloxane composed of from 1 to 500 chemically combined diorganosiloxy units of the formula, $$R'_2SiO$$

and (B) 5 to 99 percent by weight of the reaction product of a dihydroxy compound of the formula,

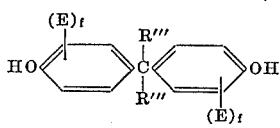

and a carbonyl halide, where Q is a member selected from the class consisting of -O-,

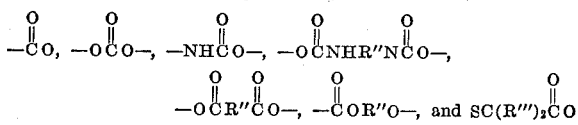

R is a monovalent radical free of aliphatic unsaturation selected from the class consisting of monovalent hydrocarbon radicals and halogenated monovalent hydrocarbon radicals, R' is selected from the class consisting of monovalent hydrocarbon radicals, halogenated monovalent hydrocarbon radicals, and cyanoalkyl radicals, R" is selected from the class consisting of divalent hydrocarbon radicals and halogenated divalent hydrocarbon radicals, E is selected from the class consisting of halogen radicals and alkyl radicals, R''' is selected from the class consisting of hydrogen and R radicals, V is an alkyl radical, $a$ is a whole number equal to 0 to 2, inclusive, $d$ is 0 or 1,

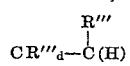

is part of a saturated aliphatic or cycloaliphatic radical, and $f$ is a whole number equal to 0 to 4, inclusive.

4. A composition in accordance with claim 3, where the polydiorganosiloxane blocks of said copolymer are joined to the polycarbonate blocks by

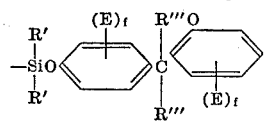

linkages, where R' is selected from the class consisting of monovalent hydrocarbon radicals, halogenated monovalent hydrocarbon radicals, and cyanoalkyl radicals, R''' is selected from hydrogen and monovalent radicals free of aliphatic unsaturation selected from hydrocarbon radicals and halogenated hydrocarbon radicals, E is selected from the class consisting of halogen radicals and alkyl radicals, and $f$ is a whole number equal to 0 to 4, inclusive.

5. A composition in accordance with claim 3, where the polycarbonate blocks are chemically combined with polydiorganosiloxane blocks having terminal

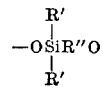

units, where R' is selected from the class consisting of monovalent hydrocarbon radicals, halogenated monovalent hydrocarbon radicals and cyanoalkyl radicals, and R" is selected from the class consisting of divalent hydrocarbon radicals and halogenated divalent hydrocarbon radicals.

6. A composition in accordance with claim 3, where the polycarbonate blocks of said copolymer are chemically combined with polydiorganosiloxane blocks having terminal

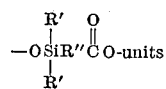

where R' is selected from the class consisting of monovalent hydrocarbon radicals, halogenated monovalent hydrocarbon radicals and cyanoalkyl radicals, and R" is selected from the class consisting of divalent hydrocarbon radicals and halogenated divalent hydrocarbon radicals.

7. A composition in accordance with claim 3, where the polycarbonate blocks of said copolymer are chemically combined with polydiorganosiloxane blocks having terminal

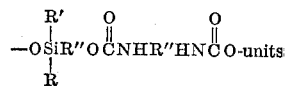

where R' is selected from the class consisting of monovalent hydrocarbon radicals, halogenated monovalent hydrocarbon radicals and cyanoalkyl radicals, R" is selected from the class consisting of divalent hydrocarbon radicals and halogenated divalent hydrocarbon radicals.

8. A composition comprising a copolymer having monovalent organosilyl radicals of the formula,

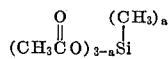

attached by carbon-silicon bonds to said copolymer through a divalent organo radical selected from the class consisting of

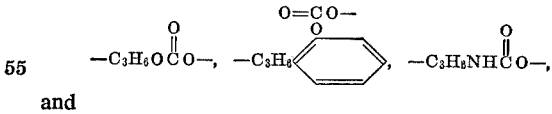

and

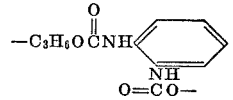

which copolymer consists essentially of chemically combined blocks of (A) from 50 to 95 percent by weight of polydiorganosiloxane consisting essentially of chemically combined dimethylsiloxy units and (B) from 5 to 50 percent by weight of the reaction product of 2,2-bis-(4-hydroxyphenyl)propane and carbonyl chloride, where said polydiorganosiloxane blocks consisting essentially of dimethylsiloxy units have terminal units selected from the class consisting of

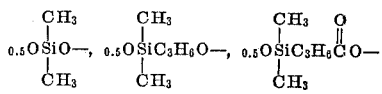

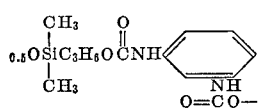

where *a* is a whole number equal to 0 to 2, inclusive.

9. A composition in accordance with claim 8 in which the polydiorganosiloxane blocks of said copolymer consists essentially of from 1 to 200 chemically combined dimethylsiloxy units.

10. A composition comprising a copolymer having methyldiacetoxysilyl radicals attached by carbon-silicon bonds to the copolymer by propyl carbonate linkages, which copolymer consists essentially of chemically combined blocks of (A) from 50 to 85 percent by weight of polysiloxane composed of from 1 to 200 chemically combined siloxy units consisting essentially of dimethylsiloxy units and (B) from 15 to 50 percent by weight of the reaction product of 2,2-bis(4-hydroxyphenyl)propane and carbonyl chloride.

11. A composition in accordance with claim 10 where said polysiloxane has terminal

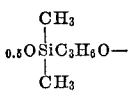

units.

12. A composition in accordance with claim 10 where said polysiloxane has terminal

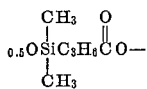

units.

13. A method which comprises (1) phosgenating a mixture of (A) a dihydroxy compound of the formula,

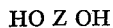

(B) an organopolysiloxane of the formula,

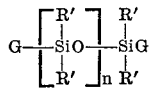

and (C) an aliphatically unsaturated monohydroxy compound of the formula,

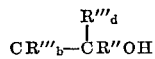

(2) recovering from (1) a copolymer containing aliphatically unsaturated radicals which copolymer consists essentially of chemically combined blocks of organopoly-siloxane and polycarbonate, (3) contacting said copolymer with a silicon hydride of the formula,

in the presence of a platinum catalyst, and (4) recovering from (3) a copolymer consisting essentially of chemically combined blocks of organopolysiloxane and polycarbonate having silyl radicals with hydrolyzable radicals attached to silicon which are attached to the copolymer by carbon-silicon bonds, where R is a monovalent radical free of aliphatic unsaturation selected from the class consisting of hydrocarbon radicals and halogenated hydrocarbon radicals, R' is selected from the class consisting of monovalent hydrocarbon radicals, halogenated monovalent hydrocarbon radicals, and cyanoalkyl radicals, R'' is selected from the class consisting of divalent hydrocarbon radicals and halogenated divalent hydrocarbon radicals, Y is a hydrolyzable radical, Z is selected from the class consisting of R'' and R''WR'', G is selected from

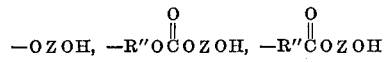

and

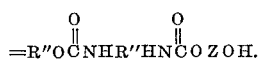

W is a divalent radical selected from the class consisting of divalent oxyaryleneoxy, sulfonyl, sulfinyl, oxy and thio, *a* is a whole number equal to 0 to 2, inclusive, *b* is 1 or 2, *d* is 0 or 1,

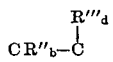

is part of an aliphatic or cycloaliphatic radical, R''' is selected from the class consisting of hydrogen and R radicals, and *n* is an integer equal to 1 to 500, inclusive.

References Cited

UNITED STATES PATENTS

| | | | |
|---|---|---|---|
| 3,189,662 | 6/1965 | Vaughn | 260—824 |
| 3,207,814 | 9/1965 | Goldberg | 260—824 |

FOREIGN PATENTS

| | | |
|---|---|---|
| 940,419 | 10/1963 | Great Britain. |
| 697,657 | 11/1964 | Canada. |
| 703,921 | 2/1965 | Canada. |

MURRAY TILLMAN, *Primary Examiner.*

P. LIEBERMAN, *Assistant Examiner.*

U.S. Cl. X.R.

117—127, 135.1; 260—33.2, 33.8, 37, 46.5, 47, 77.5